United States Patent Office 3,661,955
Patented May 9, 1972

3,661,955
POLYESTERS OF CITRIC ACID AND SORBITOL
Albert Peter Centolella, Edwardsburg, Mich., and Billy Gene Razor, Elkhart, Ind., assignors to Miles Laboratories, Inc., Elkhart, Ind.
No Drawing. Filed Nov. 3, 1969, Ser. No. 873,711
Int. Cl. C07c 69/66
U.S. Cl. 260—404 B                                   5 Claims

ABSTRACT OF THE DISCLOSURE

Polyesters of citric acid and sorbitol having less than one free carboxyl group per mole of citric acid in the polyester and physiologically acceptable salts thereof are disclosed, the polyesters having a molar ratio of citric acid to sorbitol between 1:2 and 2:3. These polyesters are useful as additives in yeast raised products.

BACKGROUND OF THE INVENTION

It has been known to use polyesters of citric acid and sorbitol as intermediates in the manufacture of medicines. Also, it has been known to use such compounds as emulsifiers and for the retardation of spoiling in food products.

More recently, it has been found that polyesters of citric acid and sorbitol when used as additives in yeast raised products have advantageous effects in the preparation of yeast raised products and on final products.

The known polyesters, as defined in the prior art, had more than one free carboxyl group per mole of citric acid in the polyester. Because of the structure of these prior art polyesters, they were not fully suited for the desired uses thereof.

SUMMARY OF THE INVENTION

It has been unexpectedly found that a composition of matter may be prepared comprising polyesters of citric acid and sorbitol having less than one free carboxyl group per mole of citric acid in the polyester and physiologically acceptable salts thereof if the ratio of citric acid to sorbitol in the polyester is between 1:2 and 2:3. Surprisingly, the polyesters of this invention may be prepared by heating an aqueous solution of citric acid and sorbitol in a molar ratio between 1:2 and 2:3 at a pressure of less than 250 mm. Hg (based on an atmospheric pressure of 760 mm. Hg).

DESCRIPTION OF PREFERRED EMBODIMENTS

The polyesters of this invention must meet the critical parameter of the ratio of citric acid to sorbitol therein being between 1:2 and 2:3. Furthermore, based upon theoretical calculations, polyesters of this invention with a molar ratio of citric acid to sorbitol of 1:2 must have a percent free carboxyl less than 8.7 and a saponification number greater than 230, and polyesters of this invention with a molar ratio of citric acid to sorbitol of 2:3 must have a percent free carboxyl of less than 10.5 and a saponification number greater than 279. It is recognized that some ether links may be formed in the polyester and, therefore, since the limiting parameter of saponification number increases with increasing ether links in the polyester, this parameter has been calculated for the extreme condition of two ether links per mole of sorbitol in the polyester. Table 1 sets forth representative theoretical values of percent free carboxyl and saponification number for polyesters having from 0 to 2 ether links per mole of sorbitol. The theoretical limiting values of percent free carboxyl and saponification number as established by this invention may be readily calculated by one skilled in the art for other molar ratios between 1:2 and 2:3.

TABLE 1

1:2 Molar Ratio Citric Acid to Sorbitol

| | Ether links per sorbitol moiety | | | | | |
|---|---|---|---|---|---|---|
| | 0 | | 1 | | 2 | |
| Number of free carboxyl groups per mole of citric acid | Percent free carboxyl | Saponification number | Percent free carboxyl | Saponification number | Percent free carboxyl | Saponification number |
| 1 | 8.7 | 215 | 9.0 | 223 | 9.3 | 230 |
| ½ | 4.4 | 274 | 4.8 | 297 | 5.1 | 319 |
| ⅓ | 2.95 | 294 | 3.2 | 318 | 3.45 | 342 |
| ¼ | 2.2 | 304 | 2.3 | 316 | 2.4 | 328 |

2:3 Molar Ratio Citric Acid to Sorbitol

| | | | | | | |
|---|---|---|---|---|---|---|
| 1 | 10.5 | 261 | 10.9 | 270 | 11.2 | 279 |
| ¾ | 8.0 | 298 | 8.5 | 320 | 9.1 | 341 |
| ⅔ | 7.1 | 308 | 7.4 | 318 | 7.6 | 328 |

Table 2 sets forth some examples of representative values for the parameters of polyesters of this invention. It is believed that these polyesters form as mixtures and therefore, these figures represent an average of the different values of percent free carboxyl, saponification number, number of ether links (Y) per mole of sorbitol and number of free carboxylic groups per mole of citric acid. These variations in the properties of each polyester may be attributed to the different reaction conditions used in their preparation as will be established by the examples herein describing in detail the preparation thereof.

TABLE 2

| Molecular ratio (citric acid:sorbitol) | Percent free carboxyl | Saponification No. | Ether links (Y) per mole sorbitol | Number free carboxyl groups per mole of citric acid (X) |
|---|---|---|---|---|
| 2:3 | 8.5 | 325 | 1<Y 2 | X=¾ |
| 2:3 | 7.7 | 317 | 1<Y<2 | ⅔<X<¾ |
| 2:3 | 8.3 | 308 | Y=1 | ⅔<X<¾ |
| 1:2 | 8.0 | 244 | 1<Y<2 | ½<X<1 |
| 1:2 | 5.2 | 271 | 0<Y<1 | ½<X<1 |
| 1:2 | 3.7 | 308 | Y=2 | ⅓<X<½ |

The polyester of this invention may be prepared by heating an aqueous solution of citric acid and sorbitol under a subatmospheric pressure, i.e. less than 760 mm. Hg. To achieve a reasonable reaction rate the pressure is preferably less than 250 mm. of mercury and the reaction mixture is preferably maintained at a temperature higher than 130° C. During the reaction, the water of esterification is drawn from the reaction vessel and the state of the reaction or degree of esterification is determined by measuring the free carboxyl value of the reaction mixture. When the desired degree of esterification is obtained, as determined by the parameters previously set forth, the reaction is terminated and the reaction vessel cooled. A crystalline product forms which may be reduced to a desired degree of fineness according to known grinding techniques.

These polyesters may be used as the free acids or as physiologically acceptable alkaline metal or alkaline earth metal salts thereof. These salts may be prepared by total or partial neutralization of the polyester in a slurry or solution with a base, such as, calcium carbonate, calcium hydroxide, sodium carbonate, sodium hydroxide, and the like to form a salt. Alkaline metals or alkaline earth metals such as sodium, potassium, calcium and other suitable metals from the Groups I-A and II-A of the Periodic Table may be used to form these salts.

A spray dried product may be beneficially prepared from the solution of polyester salt. This solution may be formed by total or partial neutralization of the polyester free acid with a suitable base selected from those previously described.

The saponification number of these polyesters may be determined according to known analytical techniques. In one such technique, the percent free carboxyl of the polyester is first determined by titration of the polyester free acid with a solution of potassium hydroxide using a phenolphthalein indicator to a pink end-point. An additional known quantity of potassium hydroxide solution is added to the resulting solution and, after refluxing, the solution is titrated with hydrochloric acid solution to a colorless phenolphthalein end-point. The saponification number is then calculated with these values according to the following formula:

Saponification No.
$$= \frac{[ml._{KOH\ added} \times N_{KOH}] - [ml._{HCl} \times N_{HCl}] \times 56.1}{wt.\ of\ sample}$$

Polyesters of citric acid and sorbitol or the salts thereof when used in minor amounts, for example between 0.125% and 0.5%, as dough additives in yeast raised baked products produce significant improvements in the preparation of and in the final product. These improvements include, for example, in the preparation, lower mixing energy, and in the final product better volume, crust, slicing, aroma, taste and texture. It is desirable to have polyesters of citric and sorbitol with few free carboxyl groups, such as the compositions of this invention, because less acidic compositions tend to be better emulsifiers, which is a desired property of a dough additive. Also, compounds with fewer free carboxyl groups have been observed to generally be less hygroscopic and therefore, may be more easily handled and are less likely to cake or deteriorate upon exposure to the atmosphere.

The preparation of the compositions of this invention will be further understood by reference to the following examples which set forth the particulars of the preparation of specific polyesters of this invention.

EXAMPLE 1

A mixture of citric acid (384 grams, 2 moles), sorbitol (546 grams, 3 moles) and water (deionized, 234 ml.) in a three-necked flask was heated to between 60° and 70° C. and stirred until a clear solution formed. A pressure of between 100 and 122 mm. Hg (based on an atmospheric pressure of 760 mm. Hg) was applied to the flask as it was heated, with stirring, to a temperature between 150° and 154° C. During the heating, samples were drawn from the reaction mixture and the free carboxyl value thereof determined. When free carboxyl values of 9.2% and 8.8% were observed with two samples, the heating was terminated and the flask cooled. A viscous material formed in the flask which was poured into a shallow stainless steel pan and allowed to solidify. The resulting solid was a yellow crystalline substance.

Free carboxyl: 8.5%.
Saponification No.: 325.

From Table 1 it was determined that this composition had more than one but less than two ether links per mole of sorbitol and ¾ free carboxyl group per mole of citric acid.

EXAMPLE 2

A mixture of citric acid (384 grams, 2 moles), sorbitol (546 grams, 3 moles) and water (deionized, 234 ml.) in a three-necked flask was heated to between 60° and 70° C. and stirred until a clear solution formed. A pressure of between 143 and 239 mm. of mercury was applied to the flask as it was heated with stirring to a temperature between 133° and 151° C. During the heating, samples were drawn from the reaction mixture and the free carboxyl value thereof determined. When free carboxyl values of 8.4% and 9.3% were observed with two samples, the heating was terminated and the flask cooled. A viscous material formed in the container which was heated and poured into a shallow stainless steel pan and allowed to solidify. The resulting solid was ground to form the desired polyester.

Free carboxyl: 7.7%.
Saponification No.: 317.

From Table 1 it was determined that this composition had more than 1 but less than 2 ether links per mole of sorbitol and more than ⅔ but less than ¾ free carboxyl group per mole of citric acid.

EXAMPLE 3

A mixture of citric acid (128 grams, ⅔ mole), sorbitol (182 grams, 1 mole) and water (deionized, 78 ml.) in a three-necked flask was heated to between 60° and 70° C. and stirred until a clear solution formed. A pressure of between 137 and 205 mm. mercury was applied to the flask as it was heated with stirring to a temperature between 137° and 151° C. During the heating, samples were drawn from the reaction mixture and the free carboxyl value thereof determined. When free carboxyl values of 8.8% and 9.6% were observed for two samples, the heating was terminated and the flask cooled. A viscous material formed in the flask which was poured into a shallow stainless steel pan and allowed to solidify. The resulting solid was a yellow crystalline substance.

Free carboxyl: 8.3%.
Saponification No.: 308.

From Table 1 it was determined that this composition had 1 ether link per mole of sorbitol and more than ⅔ and less than ¾ free carboxyl group per mole of citric acid.

EXAMPLE 4

A mixture of citric acid (384 grams, 2 moles), sorbitol (728 grams, 4 moles) and water (deionized, 312 ml.) in a three-necked flask was heated to between 60° and 70° C. and stirred until a clear solution formed. A pressure of between 112 and 137 mm. of mercury was applied to the flask as it was heated with stirring to a temperature between 122° and 138° C. During the heating, samples were drawn from the reaction mixture and the free carboxyl value thereof determined. When free carboxyl values of 7.7 and 8.1 were observed with two samples, the heating was terminated and the flask cooled. A viscous material formed in the flask which was poured into a shallow stainless steel pan and allowed to solidify. The resulting solid was a yellow crystalline substance.

Free carboxyl: 8%.
Saponification No.: 244.

From Table 1 it was determined that this composition had more than 1 but less than 2 ether links per mole of sorbitol and more than ½ but less than 1 free carboxyl group per mole of citric acid.

EXAMPLE 5

A mixture of citric acid (128 grams, ⅔ mole), sorbitol (234 grams, 1⅓ moles) and water (deionized, 104 ml.) in a three-necked flask was heated to between 60° and 70° C. and stirred until a clear solution formed. A pressure of between 92.6 and 102 mm. of mercury was applied to the flask as it was heated with stirring to a temperature between 129° and 139° C. During the heating, samples were drawn from the reaction mixture and the free carboxyl value thereof determined. When free carboxyl values of 5.2% and 4.8% were observed with two samples, the heating was terminated and the flask cooled. A viscous material formed in the flask which was poured into a shallow stainless steel pan and allowed to solidify. The resulting solid was a yellow crystalline substance.

Free carboxyl: 5.2%.
Saponification No.: 271.

From Table 1 it was determined that this composition had less than 1 ether link per mole of sorbitol and more than ½ but less than 1 free carboxyl group per mole of citric acid.

EXAMPLE 6

A mixture of citric acid (128 grams, ⅔ mole), sorbitol 234 grams, 1½ moles) and water (deionized, 104 ml.) in a three-necked flask was heated to between 60° and 70° C. and stirred until a clear solution formed. A pressure of between 67 and 137 mm. of mercury was applied to the flask as it was heated with stirring to a temperature between 132° and 140° C. During the heating, samples were drawn from the reaction mixture and the free carboxyl value thereof determined. When free carboxyl values of 4.6% were observed for two samples, the heating was terminated and the flask cooled. The reaction mixture was heated at atmospheric pressure to the melting temperature and maintained at such temperature until free carboxyl values of 4.1% and 4.5% were observed with two samples. A yellow crystalline material formed on cooling which was ground to a fine powder.

Free carboxyl: 3.7%.
Saponification No.: 308.

From Table 1 it was determined that this composition had 2 ether links per mole of citric acid and more than ⅓ but less than ½ free carboxyl group per mole of citric acid.

What is claimed is:

1. A composition of matter selected from polyesters of citric acid and sorbitol having less than one free carboxyl group per mole of citric acid in the polyester and physiologically acceptable salts thereof, said polyesters having a molar ratio of citric acid to sorbitol between 1:2 and 2:3.

2. Polyesters according to claim 1 having a molar ratio of citric acid to sorbitol of 1:2 in which the polyesters have a saponification number greater than 230.

3. Polyesters according to claim 1 having a molar ratio of citric acid to sorbitol of 1:2 in which the polyester free acids have a percent free carboxyl less than 8.7.

4. Polyesters according to claim 1 having a molar ratio of citric acid to sorbitol of 2:3 in which the polyesters have a saponification number greater than 279.

5. Polyesters according to claim 1 having a molar ratio of citric acid to sorbitol of 2:3 in which the polyesters free acids have a percent free carboxyl less than 10.5.

References Cited

UNITED STATES PATENTS 2,118,958   5/1938   Schmidt et al. _____ 260—484 B

FOREIGN PATENTS 894,752   4/1962   Great Britain.

LORRAINE A. WEINBERGER, Primary Examiner

P. J. KILLOS, Assistant Examiner

U.S. Cl. X.R.

99—91